United States Patent
Dwork

(10) Patent No.: US 6,311,284 B1
(45) Date of Patent: Oct. 30, 2001

(54) USING AN INDEPENDENT CLOCK TO COORDINATE ACCESS TO REGISTERS BY A PERIPHERAL DEVICE AND A HOST SYSTEM

(75) Inventor: Jeffrey R. Dwork, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/270,240

(22) Filed: Mar. 15, 1999

(51) Int. Cl.[7] ............................... G06F 1/12; G06F 3/00; G06F 15/16
(52) U.S. Cl. ............................ 713/400; 709/232; 710/5; 370/229
(58) Field of Search ................................ 710/400, 5, 29; 370/229; 709/232

(56) References Cited

U.S. PATENT DOCUMENTS

| | | | |
|---|---|---|---|
| 5,319,752 | * 6/1994 | Petersen et al. | 709/234 |
| 5,440,545 | * 8/1995 | Buchholz et al. | 370/426 |
| 5,519,699 | * 5/1996 | Ohsawa | 370/231 |
| 5,592,630 | * 1/1997 | Yamagami et al. | 711/117 |
| 5,754,803 | * 5/1998 | Regis | 710/119 |
| 5,809,334 | * 9/1998 | Galdun et al. | 710/22 |
| 5,938,728 | * 8/1999 | Dwork et al. | 709/222 |
| 5,948,079 | * 9/1999 | Tsai et al. | 710/20 |
| 6,070,248 | * 5/2000 | Yu et al. | 713/501 |
| 6,087,867 | * 7/2000 | Holm | 327/144 |

FOREIGN PATENT DOCUMENTS

402205936A  *  8/1990  (JP).

* cited by examiner

Primary Examiner—Thomas Lee
Assistant Examiner—Chun Cao
(74) Attorney, Agent, or Firm—Monica H. Choi

(57) ABSTRACT

The present invention coordinates access to at least one data register between a peripheral device and a host system. The peripheral device accesses the at least one data register to update the data register with new register data and operates on a peripheral device clock. The host system accesses the at least one data register to read the register data stored within the at least one register via a bus interface that operates on a bus clock. The at least one data register is within a statistics module that operates on an independent clock. The present invention includes a handshaking mechanism for synchronization between the peripheral device clock and the independent clock when the peripheral device has new register data for updating the at least one register. In addition, the present invention includes a handshaking mechanism for synchronization between the bus clock and the independent clock when the host system requests access to the at least one data register to read the register data stored within the at least one register via the bus interface. Furthermore, the present invention includes a handshaking mechanism when the host system requests access to read the register data stored within the at least one register via the bus interface at the same time that the peripheral device has new register data for updating the at least one register.

14 Claims, 4 Drawing Sheets

USING AN INDEPENDENT CLOCK TO COORDINATE ACCESS TO REGISTERS BY A PERIPHERAL DEVICE AND A HOST SYSTEM

TECHNICAL FIELD

This invention relates generally to computer peripheral devices, and more particularly, to a mechanism for coordinating access to registers by a computer peripheral device and by a host system using an independent clock at the registers.

BACKGROUND OF THE INVENTION

The present invention will be described with an example application for an Ethernet computer network peripheral device which couples a host computer system to a network of computers. In this example application, the Ethernet computer network peripheral device updates a set of registers with new statistical data regarding transmission or reception of data packets over the network of computers, and the host computer system accesses such a set of registers for reading such statistical data. However, from this example application, it should be appreciated by one of ordinary skill in the art of electronic systems design that the present invention may be used for other applications requiring coordination of access to a set of registers by any type of computer peripheral device and a host system.

Referring to FIG. 1, a computer peripheral device 102 may be an Ethernet computer network peripheral device which allows a host computer 104 to communicate with other computers within a network of computers 106. Such a computer peripheral device 102 receives and transmits data packets via the network of computers 106. The computer peripheral device 102, which may be an Ethernet computer network peripheral device, receives and transmits data packets on the network of computers 106 in accordance with standard data communications protocols such as the IEEE 802.3 network standard or the DIX Ethernet standard as is commonly known to one of ordinary skill in the art of Ethernet computer network peripheral device design.

An example Ethernet computer network peripheral device 102 which operates according to the IEEE 802.3 network standard is described in a copending U.S. patent application entitled Mechanism for Run Time Programming of Hardware Resources with Least Interference with Continued Operation having Ser. No. 09/244431 and Filing Date Feb. 4, 1999 and having common assignee herewith. This patent application with Ser. No. 09/244431 is incorporated herewith by reference.

The host computer 104 may be a PC or any other type of computer, and has a host system which includes a CPU 108. The CPU 108 further processes a data packet received from the network of computers 106 or generates a data packet to be transmitted on the network of computers 106. A bus interface 110 is disposed between the CPU 108 and the peripheral device 102, and data is exchanged between the peripheral device 102 and the CPU 108 via the bus interface 110.

As discussed in U.S. patent application with Ser. No. 09/244431 referring to FIG. 2, the computer network peripheral device 102 has a peripheral device function module 202 for transmitting and receiving data packets via the network of computers 106. The peripheral device function module 202 is also referred to as a transmit control block for transmission of data packets via the network of computers 106 and as a receive control block for reception of data packets over the network of computers 106. The peripheral device function module 202 may be implemented with any type of data processing device.

The peripheral device function module 202 runs on a peripheral device clock 204. In some computer network peripheral devices, the peripheral device clock 204 may be from the network of computers 106 and typically runs at 25 MHZ (megahertz) or 2.5 MHZ (megahertz), depending on the rate of data transmission or reception over the network of computers 106. In addition, the peripheral device clock 204 may be stopped if the network of computers 106 is inoperative or if the connector that couples the peripheral device function module 202 to the clock of the network of computers 106 is unplugged.

When the peripheral device function module 202 transmits or receives data packets over the network of computers 106, the peripheral device function module 202 updates a statistics module 206. The statistics module 206 keeps track of statistical data regarding transmission and reception of data packets over the network of computers 106 in a set of data registers 208. Such statistical data may be related to the number of data packets transmitted or received within a given time period, or the number of different type of errors such as dribbling bit errors, frame check sequence errors, etc. as known to one of ordinary skill in the art of computer network peripheral device design.

The statistics module 206 may further be implemented with incrementers, adders, or any other type of data processing elements known to one of ordinary skill in the art of digital systems design for updating the data registers 208. The data registers 208 may be implemented with typical data registers or any other type of date storage elements as known to one of ordinary skill in the art of digital systems design.

The CPU 108 of the host system 104 also accesses the statistics module 206 for reading the statistical data stored in the data registers 208 via the bus interface 110. The bus interface 110 runs on a bus clock 210. The bus clock 210 is typically the clock for running the host system 104, and typically has a nominal frequency of 33 MHZ or 25 MHZ. However, because the host system 104 also has power saving features, the bus clock may vary from the nominal frequency down to zero Hz. For example, the source of the bus clock 210 may not be running if the host system 104 is in a power savings mode as known to one of ordinary skill in the art of computer systems design.

However, even when the bus clock 210 is not running, the peripheral device function module 202 needs to update the statistics module 206. Thus, the statistics module 206 cannot run on the bus clock 210. Alternatively, even when the peripheral device clock 204 is inoperative, the bus interface 110 needs to be able to access the statistics module 206 to read statistics data from the data registers 208. Thus, the statistics module 206 cannot run on the peripheral device clock 204.

Thus, the statistics module 206 runs on an independent clock 212 disposed within the statistics module 206. In addition, a handshaking mechanism for synchronizing to the peripheral device clock 204 and to the independent clock 212 is desired when the peripheral device function module 202 has new statistical data for updating the statistics module 206. Furthermore, a handshaking mechanism for synchronizing to the peripheral device clock 204, to the bus clock 210, and to the independent clock 212, is desired when the peripheral device function module 202 has new statistical data for updating the statistics module 206 and when the bus interface 110 requests access to read the data registers 208.

SUMMARY OF THE INVENTION

Accordingly, a primary object of the present invention is to coordinate access to at least one register between a peripheral device and a host system. The at least one register is within a statistics module. The present invention includes a peripheral device clock within the peripheral device for synchronizing operations within the peripheral device and a bus clock, within a bus interface that couples the host system to the statistics module, for synchronizing operations within the bus interface. An independent clock is within the statistics module for synchronizing operations within the statistics module.

In a general aspect of the present invention, a first valid signal is asserted from the peripheral device, when a taken signal from the statistics module is not asserted, to indicate that the peripheral device has new statistical data for updating the at least one register within the statistics module. The first valid signal is synchronized to the peripheral device clock within the peripheral device. A second valid signal is asserted and is synchronized to the independent clock at the statistics module from the first valid signal being asserted. The new statistical data is accepted by the statistics module from the peripheral device when the second valid signal has been asserted. The taken signal is asserted at the statistics module after the new statistical data has been substantially received by the statistics module from the peripheral device. The taken signal is synchronized to the independent clock within the statistic module. The first valid signal is deasserted and is synchronized to the peripheral device clock at the peripheral device after the taken signal is asserted, to indicate that the peripheral device is free to return to a foreground task.

The data registers 208 within the statistics module 206 are updated with the new statistical data while the taken signal at the statistics module is asserted. Then, the taken signal at the statistics module is deasserted after the at least one register within the statistics module has been substantially updated.

The taken signal is asserted when the statistics module is busy updating the at least one register. The present invention further includes the step of waiting to assert the first valid signal from the peripheral device, when the taken signal from the statistics module is already asserted, until the taken signal is deasserted. In this manner, the statistics module may finish updating the at least one register before the at least one register is further updated with newer statistical data.

The present invention also includes a handshaking mechanism when the host system accesses the at least one register via a bus interface to read statistical data from the at least one register. In that case, a first bus request signal is asserted from the host system on the bus interface to indicate that the host system is ready to read statistical data from the at least one register. The first bus request signal is synchronized to a bus clock. A second bus request signal is asserted and is synchronized to the independent clock at the statistics module from the first bus request signal being asserted. A bus grant signal is asserted from the statistics module after the second bus request signal is asserted to indicate that the host system may read the statistical data from the at least one register when the second valid signal is not asserted. The statistical data is read from the at least one register by the host system via the bus interface after the bus grant signal has been asserted and if the second valid signal is not asserted.

A first bus preempt signal is asserted at the statistics module when the bus grant signal is asserted and if the second valid signal is also asserted. The first bus preempt signal is synchronized to the independent clock within the statistics module. A second bus preempt signal is asserted and is synchronized to the bus clock at the bus interface from the first bus preempt signal being asserted, to indicate to the host system that the at least one register is to be updated. A first preempt acknowledgment signal is asserted and is synchronized to the bus clock at the bus interface to indicate from the host system to the statistics module that the host system acknowledges that the at least one register is to be updated. A second preempt acknowledgment signal is asserted and is synchronized to the independent clock at the statistics module, from the first preempt acknowledgment signal being asserted, to indicate that the statistics module may update the at least one register.

In this manner, the at least one register may be updated with any new statistical data before the host system reads such statistical data from the at least one register.

These and other features and advantages of the present invention will be better understood by considering the following detailed description of the invention which is presented with the attached drawings.

BRIEF DESCRIPTION OF THE DRAWINGS

The figures referred to herein are drawn for clarity of illustration and are not necessarily drawn to scale. Moreover, elements having the same reference number in FIGS. 1, 2, 3, 4, and 5 refer to elements having similar structure and function.

DETAILED DESCRIPTION

Figure 1:
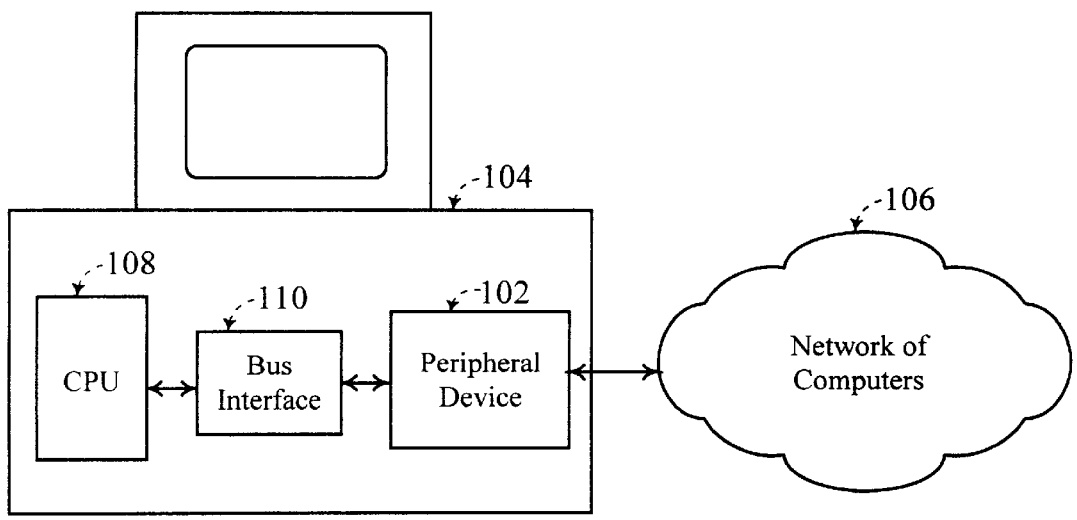
FIG. 1 shows a computer network peripheral device within a computer host system that is coupled to a network of computers.
Figure 2:
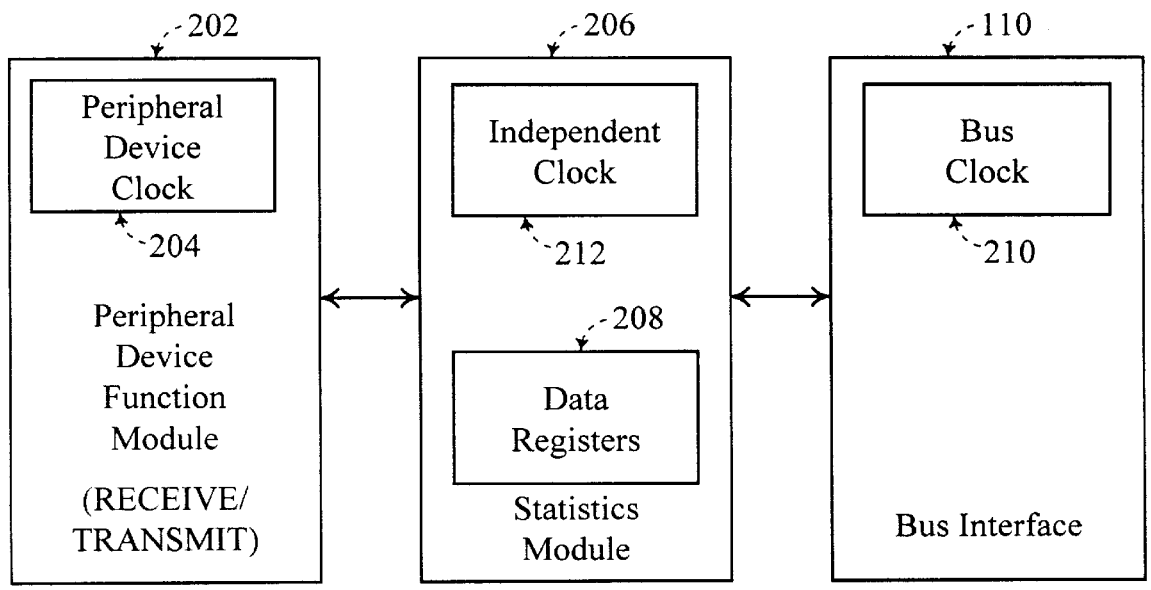
FIG. 2 shows components of the present invention for coordinating access to data registers by the peripheral device for updating the data registers and by the host system for reading statistical data from the data registers, according to the present invention.
Figure 3:
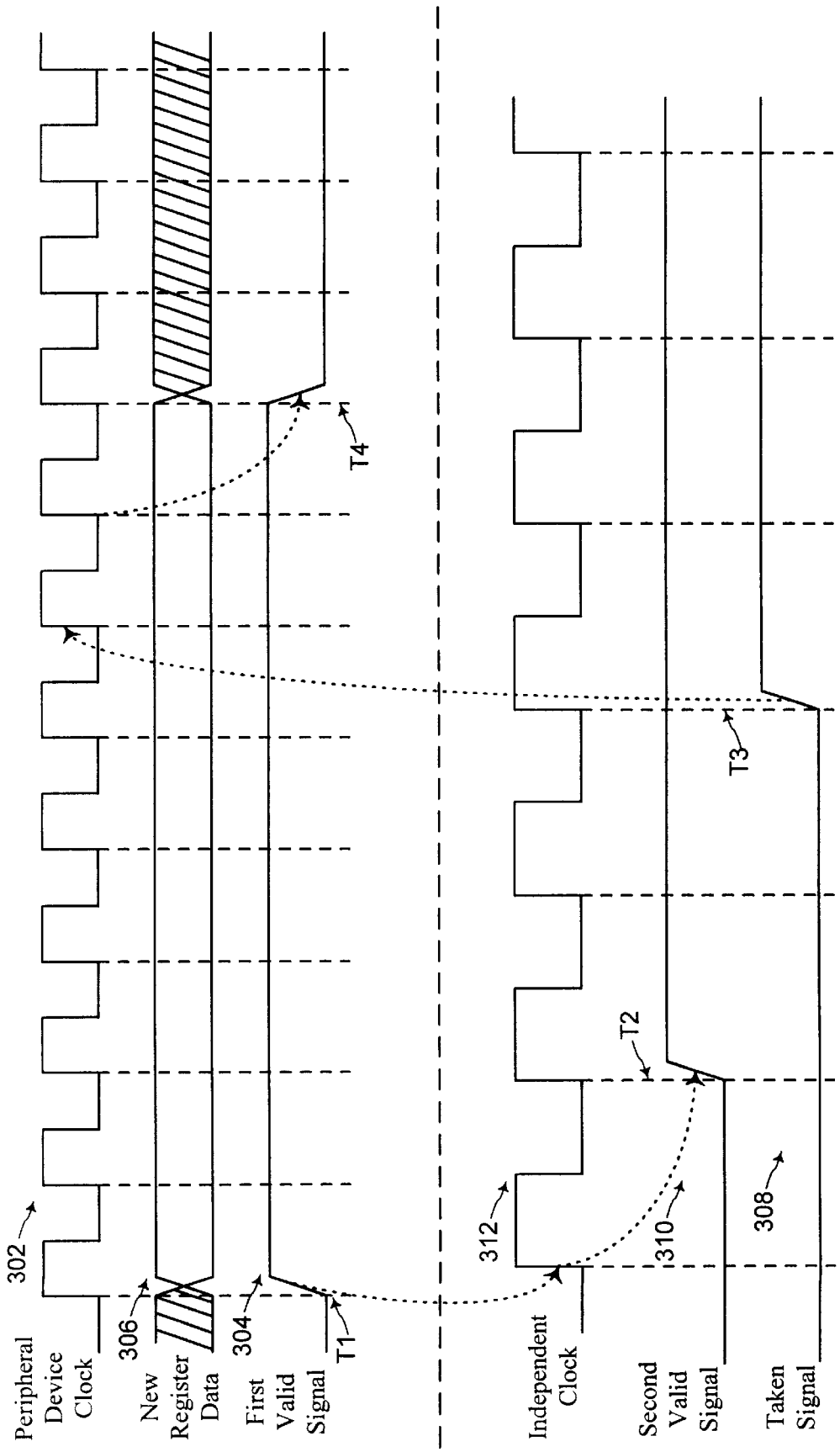
FIG. 3 shows a timing diagram illustrating the handshaking mechanism between the statistics module and the peripheral device when the peripheral device has new statistical data for updating the data registers, according to an embodiment of the present invention.

Referring to FIG. 3, a timing diagram illustrates the handshaking mechanism between the peripheral device function module 202 of the peripheral device 102 and the statistics module 206 when the peripheral device function module 202 has new statistical data for updating the data registers 208 within the statistics module 206.

The peripheral device function module 202 is driven by the peripheral device clock 204 which generates the peripheral device clock signal 302 in FIG. 3. When the peripheral device function module 202 has new statistical data for updating the data registers 208 within the statistics module 206, a first valid signal 304 is asserted at the peripheral device function module 202 of the peripheral device 102 at time point T1. The first valid signal 304 is synchronized to the peripheral device clock 302, and the assertion of the first valid signal 304 indicates that the peripheral device function module 202 has new statistical data for updating the data registers 208 within the statistics module 206. In addition, new register data 306 is presented to the statistics module 206 by the peripheral device function module 202 when the first valid signal 304 is asserted at time point T1.

The first valid signal 304 is asserted if the peripheral device function module 202 of the peripheral device 102 has new register data 306 and if a taken signal 308 generated at the statistics module 206 is not asserted (i.e., deasserted). Referring to FIG. 3, the taken signal 308 is deasserted when the new register data 306 is available at time point T1, and thus, the first valid signal 304 is asserted when the new register data 306 is available at time point T1. If the taken signal 308 is deasserted, then the statistics module 206 is not already busy updating the data registers 208.

The first valid signal 304 which is generated by the peripheral device function module 202 is synchronized to the peripheral device clock 302. A second valid signal is asserted at time point T2 and is synchronized to the independent clock 312 of the statistics module 206 from the first valid signal 304 being asserted. The independent clock 212 generates the independent clock signal 312 as shown in FIG. 3.

When the second valid signal 310 is asserted, the statistics module 206 accepts the new statistical data from the peripheral device function module 202 from time point T2 to time point T3, In FIG. 3, a time period of two cycles of the independent clock signal 312 is used for the statistics module 206 accepting the new statistical data from the peripheral device function module 202. However, as known to one of ordinary skill in the art, the present invention may be used when any number of cycles of the independent clock signal 312 is used for the statistics module 206 accepting the new statistical data from the peripheral device function module 202.

After the statistics module 206 accepts substantially all of the new statistical data from the peripheral device function module 202, the taken signal 308 is asserted at time point T3, The taken signal 308 is synchronized to the independent clock 312 within the statistic module. The assertion of the taken signal 308 indicates that the statistics module 206 has substantially received all of the new statistical data from the peripheral device function module 202 and that the peripheral device function module 202 may return to a foreground task.

After the taken signal 308 is asserted at time point T3, the first valid signal 304 is deasserted at time point T4 and is synchronized to the peripheral device clock 302. The deassertion of the first valid signal 304 indicates that the statistics module 206 has substantially received all of the new statistical data from the peripheral device function module 202 and that the peripheral device function module 202 is free to return to a foreground task. For the example of a computer network peripheral device, the peripheral device function module 202 returns to transmitting or receiving of data packets via the network of computers 106. After such a transmission or reception of data packets, the peripheral device function module 202 asserts the first valid signal 304 again to indicate further new statistical data for updating the data registers 208 of the statistics module 206. Then, the handshaking mechanism starts over again as already described with respect to FIG. 3.

Meanwhile, while the taken signal 308 is asserted, the statistics module 206 updates the data registers 208 with the new statistical data. The statistics module 206 is implemented with incrementers, adders, or any other data processing devices known to one of ordinary skill in the art for updating the data registers 208 with the new statistical data. After the statistics module 206 updates the data registers 208 with the new statistical data, the taken signal is deasserted.

In FIG. 3, the taken signal 308 was deasserted when the first valid signal 304 was asserted at time point T1 indicating that the statistics module 206 was not already busy updating the data registers 208. However, the taken signal 308 may already be asserted when new register data is available from the peripheral device function module 202 for updating the data registers 208. An assertion of the taken signal 308 indicates that the statistics module 206 is already busy updating the data registers 208. In that case, the peripheral device function module 202 waits until the taken signal is deasserted before asserting the first valid signal.

Figure 4:
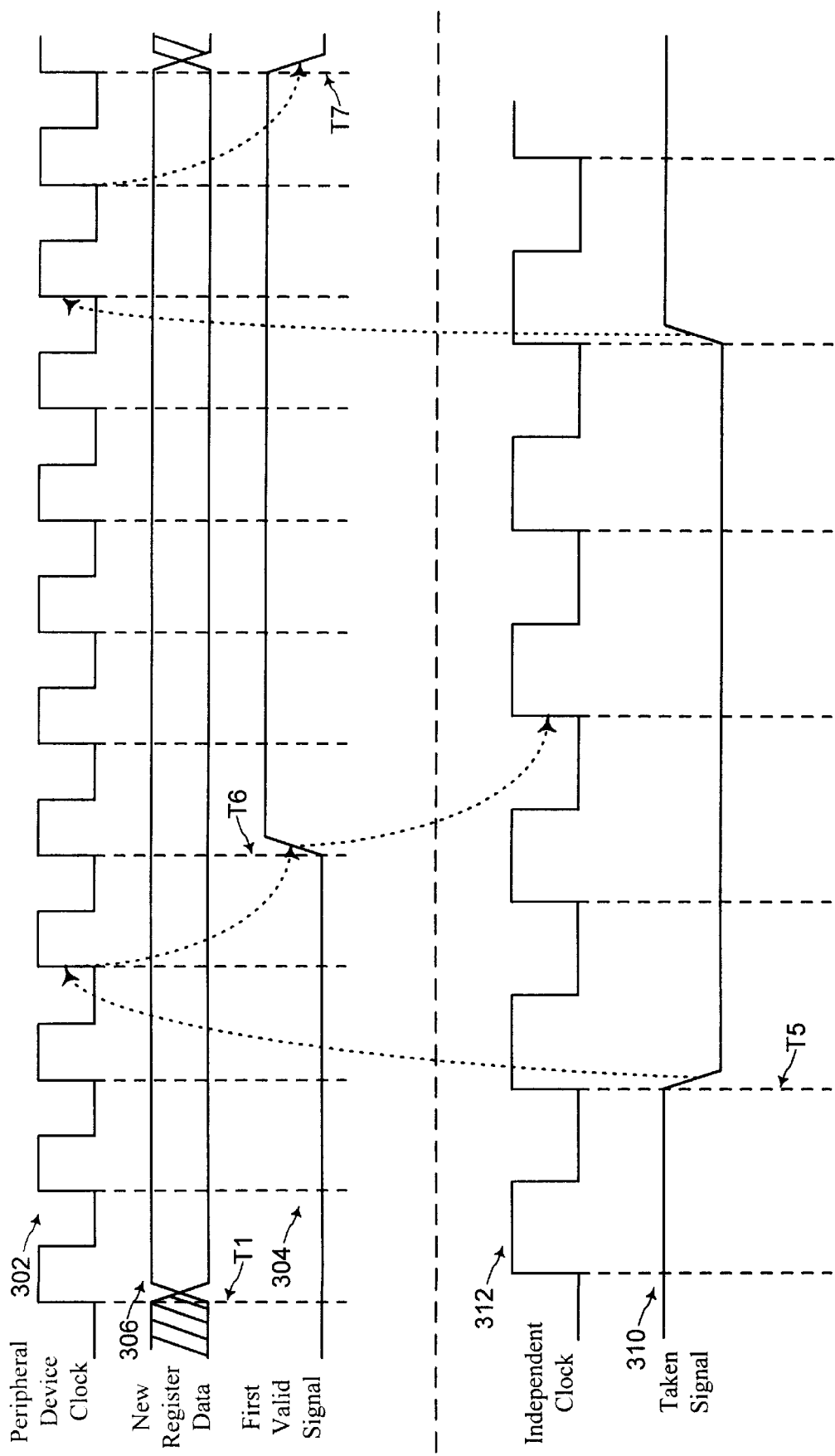
FIG. 4 shows a timing diagram illustrating the handshaking mechanism between the statistics module and the peripheral device when the peripheral device has new statistical data for updating the data registers but when the statistics module is already busy updating the data registers, according to an embodiment of the present invention.

Refering to FIG. 4, for example, when new register data 306 is available from the peripheral device function module 202 for updating the data registers 208 at time point T1, the taken signal 308 is already asserted. Thus, at time point T1, the statistics module 206 is already busy updating the data registers 208, and the peripheral device function module 202 then waits until such current updating is substantially finished. At time point T5, the taken signal 308 is deasserted indicating that the statistics module 206 has substantially finished the prior updating of the data registers 208.

After the taken signal 308 is deasserted, the first valid signal 304 is asserted at time point T6. Once the first valid signal 304 is asserted at time point T6, the data registers 208 are updated with the new register data 306 from the peripheral device function module 202 with the same handshaking mechanism as was illustrated from the assertion of the first valid signal 304 at time point T1 in FIG. 3. Similar to FIG. 3, the first valid signal 304 in FIG. 4 is deasserted at time point T7 after the statistics module 206 has substantially received the new statistical data from the peripheral device function module 202. At that time point, the peripheral device function module 202 may return to a foreground task.

Figure 5:
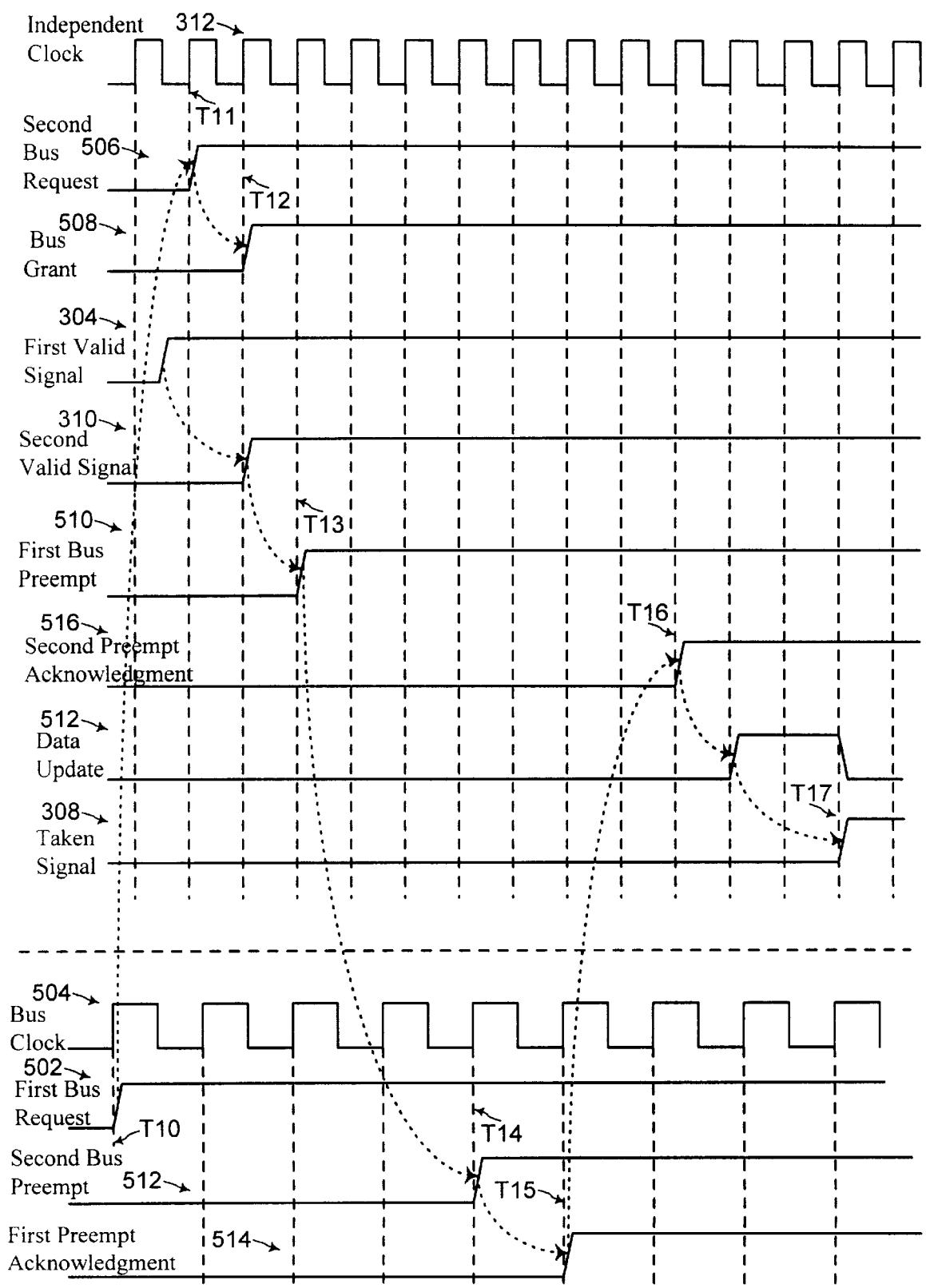
FIG. 5 shows a timing diagram illustrating the handshaking mechanism between the statistics module, the peripheral device, and the host system, when the host system is ready to read statistical data from the data registers and when the peripheral device also has new statistical data for updating the data registers, according to an embodiment of the present invention.

The timing diagrams of FIGS. 3 and 4 illustrate the handshaking mechanism used when the peripheral device function module 202 has new statistical data for updating the data registers 208. FIG. 5 illustrates the handshaking mechanism used when the host system requests access to the data registers 208 for reading the statistical data from the data registers 208 via the bus interface 110.

In that case, the CPU 108 of the host system 104 generates a first bus request signal 502 on the bus interface 110 at time point T10 to indicate that the host system is ready to read statistical data from the data registers 208. The bus clock 210 within the bus interface 110 generates a bus clock signal 504, and the first bus request signal 502 is synchronized to the bus clock signal 504.

A second bus request signal 506 is asserted at a time point T11 and is synchronized to the independent clock 312 at the statistics module 206 from the first bus request signal 502 being asserted. A bus grant signal 508 is asserted at time point T12 from the statistics module 206 after the second bus request signal 506 is asserted to indicate that the host system may read the statistical data from the data registers 208 if the second valid signal 310 (as illustrated in FIGS. 3 and 4) is not asserted. The bus grant signal 508 is synchronized to the independent clock 312 of the statistics module 206.

When the second valid signal 310 is not asserted, then the peripheral device function module 202 is not requesting an update to the data registers 208. Thus, the bus grant 508 is asserted, and the host system 104 is free to read the statistical data from the data registers 208. The host system then reads the statistical data from the data registers 208 via the bus interface 110 after the bus grant signal 508 has been asserted and if the second valid signal is not asserted.

However, the peripheral device function module 202 may also have new register data for updating the set of registers 208 when the host system 104 requests reading register data from the set of registers 208. Referring to FIG. 5, the first valid signal 304 is asserted at approximately the same time as the first bus request 502. The second valid signal 310 is also asserted at time point T12 when the bus grant 508 is asserted.

In that case, a first bus preempt signal 510 is asserted at time point T13 at the statistics module 206 and is synchronized to the independent clock 312. A second bus preempt signal 512 is then asserted at time point T14 and is synchronized to the bus clock signal 504 at the bus interface 110 from the first bus preempt signal 510 being asserted. The assertion of the second bus preempt signal 512 indicates to the host system 104 that the data registers 208 are to be updated. Referring to FIG. 5, the bus grant signal 508 is deasserted after the first bus preempt signal 510 is asserted.

A first preempt acknowledgment signal 514 is then asserted at time point T15 and is synchronized to the bus clock 504 at the bus interface 110 to indicate from the host system 104 to the statistics module 202 that the host system 104 acknowledges that the data registers 208 are to be updated. A second preempt acknowledgment signal 516 is asserted at time point T16 and is synchronized to the independent clock 312 at the statistics module 202 from the first preempt acknowledgment signal 514 being asserted. The assertion of the second preempt acknowledgment signal 516 indicates that the statistics module 202 may update the data registers 208.

Referring to FIG. 5, the statistics module 206 then substantially accepts the new statistical data from the peripheral device function module 202 during the next two cycles of the independent clock 312. The present invention may also be advantageously used when any number of clock cycles are required for substantially accepting by the statistical module 206 the new statistical data from the peripheral device function module 202. After the statistics module 206 substantially accepts the new statistical data from the peripheral device function module 202, the taken signal 308 is asserted at time point T17. The data registers 208 within the statistics module 206 are updated with the new statistical data while the taken signal at the statistics module is asserted, as already described with reference to FIG. 3 herein.

In this manner, the host system 104 is preempted from reading the data registers 208 when the peripheral device function module 202 has new statistical data for updating the data registers 208. The host system 104 waits until the data registers 208 are updated with the new statistical data and may reattempt to read the register data from the data registers 208 after the taken signal 308 in FIG. 5 has been deasserted. The deassertion of the taken signal 308 in FIG. 5 indicates that the statistics module 206 has finished updating the data registers 208 with the new statistical data.

Thus, the host system 104 may then safely reattempt to read the data registers 208. In this manner, the host system 104 obtains the most currently updated data from the data registers 208.

The foregoing is by way of example only and is not intended to be limiting. For example, the present invention may be practiced with any type of computer peripheral device aside from just the example of the computer network peripheral device. In addition, the present invention may be practiced when the data registers 208 are updated with any type of statistical data from the computer peripheral device aside from just statistical data related to transmission and reception of data packets by a computer network peripheral device. The peripheral device function module 202 may be implemented with any type of data processor which may perform the data processing functions described herein for the peripheral device function module 202, as known to one of ordinary skill in the art. In addition, the statistics module 206 may be implemented with any type of data processor which may perform the data processing functions described herein for the statistics module 206, as known to one of ordinary skill in the art. Furthermore, the bus interface 110 may be implemented with any type of bus interface device which may perform the data processing functions described herein for the bus interface 110. The invention is limited only as defined in the following claims and equivalents thereof.

I claim:

1. A method for coordinating access to at least one data register between a peripheral device and a host system, the at least one data register being within a statistics module having an independent clock, the method including the steps of:
    A. asserting a first valid signal from the peripheral device, when a taken signal from said statistics module is not asserted, to indicate that the peripheral device has new statistical data for updating said at least one data register within said statistics module, said first valid signal being synchronized to a peripheral device clock within said peripheral device;
    B. asserting a second valid signal synchronized to said independent clock at the statistics module from said first valid signal being asserted in said step A;
    C. accepting said new statistical data by said statistics module from said peripheral device when said second valid signal has been asserted in said step B;
    D. asserting said taken signal at said statistics module after said new statistical data has been substantially received by said statistics module from said peripheral device, said taken signal being synchronized to said independent clock within said statistic module; and
    E. deasserting said first valid signal synchronized to said peripheral device clock at said peripheral device after said taken signal is asserted in said step D, to indicate that said peripheral device is free to return to a foreground task.

2. The method of claim 1, further including the steps of:
    updating said at least one data register within said statistics module with said new statistical data while said taken signal at said statistics module is asserted; and
    deasserting said taken signal at said statistics module after said at least one data register within said statistics module has been substantially updated.

3. The method of claim 1, wherein said step A further includes the steps of:
    waiting to assert said first valid signal from the peripheral device, when said taken signal from said statistics module is already asserted, until said taken signal is deasserted.

4. The method of claim 1, further including the steps of:

asserting a first bus request signal from the host system on a bus interface to indicate that the host system is ready to read statistical data from said at least one data register, said first bus request signal being synchronized to a bus clock;

asserting a second bus request signal synchronized to said independent clock at the statistics module from said first bus request signal being asserted;

asserting a bus grant signal from said statistics module after said second bus request signal is asserted to indicate that the host system may read said statistical data from said at least one data register when said second valid signal is not asserted; and reading said statistical data from said at least one data register by said host system via said bus interface after said bus grant signal has been asserted and if said second valid signal is not asserted.

5. The method of claim 4, further including the steps of:

asserting a first bus preempt signal at the statistics module when the bus grant signal is asserted and the second valid signal is asserted, said first bus preempt signal being synchronized to said independent clock within said statistics module;

asserting a second bus preempt signal, synchronized to the bus clock at the bus interface from said first bus preempt signal being asserted, to indicate to said host system that said at least one data register is to be updated;

asserting a first preempt acknowledgment signal synchronized to the bus clock at the bus interface to indicate from the host system to the statistics module that said host system acknowledges that said at least one data register is to be updated; and asserting a second preempt acknowledgment signal, synchronized to the independent clock at the statistics module, from said first preempt acknowledgment signal being asserted, to indicate that said statistics module may update said at least one data register.

6. The method of claim 5, further including the steps of:

performing said steps C–E after said second preempt acknowledgment signal has been asserted at said statistics module.

7. The method of claim 1, wherein said peripheral device is a computer network peripheral device for coupling said host system to a network of computers, and wherein said at least one data register within said statistics module stores statistical data related to transmission and reception of data packets by said host system via said network of computers.

8. A method for coordinating access to at least one data register between a computer network peripheral device and a host system, the at least one data register storing statistical data within a statistics module having an independent clock, said statistical data being related to transmission and reception of data packets by said host system via said network of computers, the method including the steps of:

A. asserting a first valid signal from the computer network peripheral device, when a taken signal from said statistics module is not asserted, to indicate that the computer network peripheral device has new statistical data for updating said at least one data register within said statistics module, said first valid signal being synchronized to a peripheral device clock within said computer network peripheral device;

B. asserting a second valid signal synchronized to said independent clock at the statistics module from the first valid signal being asserted in said step A;

C. accepting said new statistical data by said statistics module from said computer network peripheral device when said second valid signal has been asserted in said step B;

D. asserting said taken signal at said statistics module after said new statistical data has been substantially received by said statistics module from said computer network peripheral device, said taken signal being synchronized to said independent clock within said statistics module;

E. deasserting said first valid signal synchronized to said peripheral device clock at said computer network peripheral device after said taken signal is asserted in said step D, to indicate that said computer network peripheral device is free to return to a foreground task;

F. updating said at least one data register within said statistics module with said new statistical data while said taken signal at said statistics module is asserted;

G. deasserting said taken signal at said statistics module after said at least one data register within said statistics module has been substantially updated;

H. waiting to assert said first valid signal from the computer network peripheral device, when said taken signal from said statistics module is already asserted, until said taken signal is deasserted;

I. asserting a first bus request signal from the host system on a bus interface to indicate that the host system is ready to read statistical data from said at least one data register, said first bus request signal being synchronized to a bus clock;

J. asserting a second bus request signal synchronized to said independent clock at the statistics module from said first bus request signal being asserted;

K. asserting a bus grant signal from said statistics module after said second bus request signal is asserted to indicate that the host system may read said statistical data from said at least one data register when said second valid signal is not asserted;

L. reading said statistical data from said at least one data register by said host system via said bus interface after said bus grant signal has been asserted and if said second valid signal is not asserted;

M. asserting a first bus preempt signal at the statistics module when the bus grant signal is asserted and the second valid signal is asserted, said first bus preempt signal being synchronized to said independent clock within said statistics module;

N. asserting a second bus preempt signal synchronized to the bus clock at the bus interface from said first bus preempt signal being asserted to indicate to said host system that said at least one data register is to be updated;

O. asserting a first preempt acknowledgment signal synchronized to the bus clock at the bus interface to indicate from the host system to the statistics module that said host system acknowledges that said at least one data register is to be updated;

P. asserting a second preempt acknowledgment signal, synchronized to the independent clock at the statistics module from said first preempt acknowledgment signal being asserted, to indicate that said statistics module may update said at least one data register; and Q. performing said steps C–E after said second preempt acknowledgment signal has been asserted at said statistics module.

9. Apparatus for coordinating access to at least one data register between a peripheral device and a host system, the at least one data register being within a statistics module, the apparatus comprising:

a peripheral device clock within said peripheral device for synchronizing operations within said peripheral device;

an independent clock within said statistics module for synchronizing operations within said statistics module;

a bus clock within a bus interface that couples said host system to said statistics module, said bus clock being within said bus interface for synchronizing operations within said bus interface;

means for asserting a first valid signal from the peripheral device, when a taken signal from said statistics module is not asserted, to indicate that the peripheral device has new statistical data for updating said at least one data register within said statistics module, said first valid signal being synchronized to said peripheral device clock within said peripheral device;

means for asserting a second valid signal synchronized to said independent clock at the statistics module from said first valid signal being asserted in said step A;

means for accepting said new statistical data by said statistics module from said peripheral device when said second valid signal has been asserted in said step B;

means for asserting said taken signal at said statistics module after said new statistical data has been substantially received by said statistics module from said peripheral device, said taken signal being synchronized to said independent clock within said statistic module; and means for deasserting said first valid signal synchronized to said peripheral device clock at said peripheral device after said taken signal is asserted in said step D, to indicate that said peripheral device is free to return to a foreground task.

10. The apparatus of claim 9, further comprising:

means for updating said at least one data register within said statistics module with said new statistical data while said taken signal at said statistics module is asserted; and means for deasserting said taken signal at said statistics module after said at least one data register within said statistics module has been substantially updated.

11. The apparatus of claim 9, further comprising:

means for waiting to assert said first valid signal from the peripheral device, when said taken signal from said statistics module is already asserted, until said taken signal is deasserted.

12. The apparatus of claim 9, further comprising:

means for asserting a first bus request signal from the host system on a bus interface to indicate that the host system is ready to read statistical data from said at least one data register, said first bus request signal being synchronized to said bus clock;

means for asserting a second bus request signal synchronized to said independent clock at the statistics module from said first bus request signal being asserted;

means for asserting a bus grant signal from said statistics module after said second bus request signal is asserted to indicate that the host system may read said statistical data from said at least one data register when said second valid signal is not asserted; and means for reading said statistical data from said at least one data register by said host system via said bus interface after said bus grant signal has been asserted and if said second valid signal is not asserted.

13. The apparatus of claim 12, further comprising:

means for asserting a first bus preempt signal at the statistics module when the bus grant signal is asserted and the second valid signal is asserted, said first bus preempt signal being synchronized to said independent clock within said statistics module;

means for asserting a second bus preempt signal, synchronized to the bus clock at the bus interface from said first bus preempt signal being asserted, to indicate to said host system that said at least one data register is to be updated;

means for asserting a first preempt acknowledgment signal synchronized to the bus clock at the bus interface to indicate from the host system to the statistics module that said host system acknowledges that said at least one data register is to be updated; and means for asserting a second preempt acknowledgment signal, synchronized to the independent clock at the statistics module from said first preempt acknowledgment signal being asserted, to indicate that said statistics module may update said at least one data register.

14. The apparatus of claim 9, wherein said peripheral device is a computer network peripheral device for coupling said host system to a network of computers, and wherein said at least one data register within said statistics module stores statistical data related to transmission and reception of data packets by said host system via said network of computers.

* * * * *